United States Patent [19]

Abe

[11] 4,075,607

[45] Feb. 21, 1978

[54] SYSTEM FOR COLLECTING DATA FROM METERS PLACED AT REMOTE PLACES

[75] Inventor: Takeshi Abe, Yokohama, Japan

[73] Assignee: Ricoh Co., Ltd., Tokyo, Japan

[21] Appl. No.: 744,186

[22] Filed: Nov. 22, 1976

[30] Foreign Application Priority Data

Nov. 25, 1975   Japan .................................. 50-140987

[51] Int. Cl.$^2$ ............................................. G08C 15/08
[52] U.S. Cl. ............................ 340/152 R; 340/188 R; 340/177 R
[58] Field of Search ............... 340/152 R, 151, 188 R, 340/188 CH, 183, 177 CA, 147 CN, 177 R, 199; 178/69 C, 69 F, 69 N, 69 R; 179/175.2 C, 15 BL, 15 BD, 15 AN

[56]   References Cited

U.S. PATENT DOCUMENTS

| | | | |
|---|---|---|---|
| 3,742,342 | 6/1973 | Schick | 340/177 R |
| 3,876,997 | 4/1975 | Farley et al. | 340/183 |
| 3,961,317 | 6/1976 | DeBrem et al. | 340/188 R |

Primary Examiner—Donald J. Yusko
Attorney, Agent, or Firm—Burgess, Ryan and Wayne

[57] ABSTRACT

A data collection system wherein a central or data collection station is interconnected through data transmission lines with a plurality of meters or terminal stations at remote places and prior to the data reading operation a high-level voltage is applied from the central station to charge the stray capacitance between the data transmission lines and ground and thereafter a predetermined voltage is applied for reading data.

5 Claims, 15 Drawing Figures

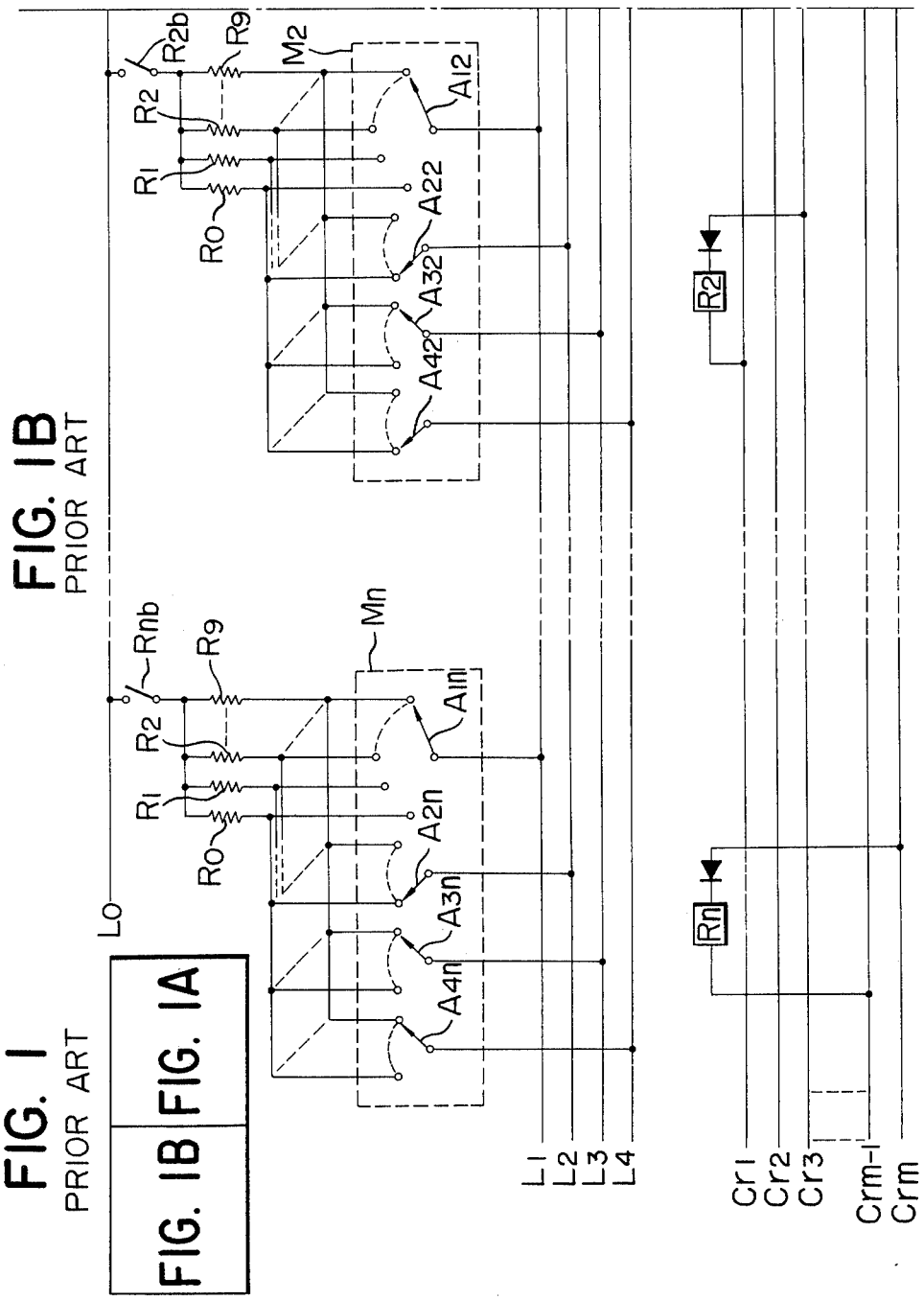

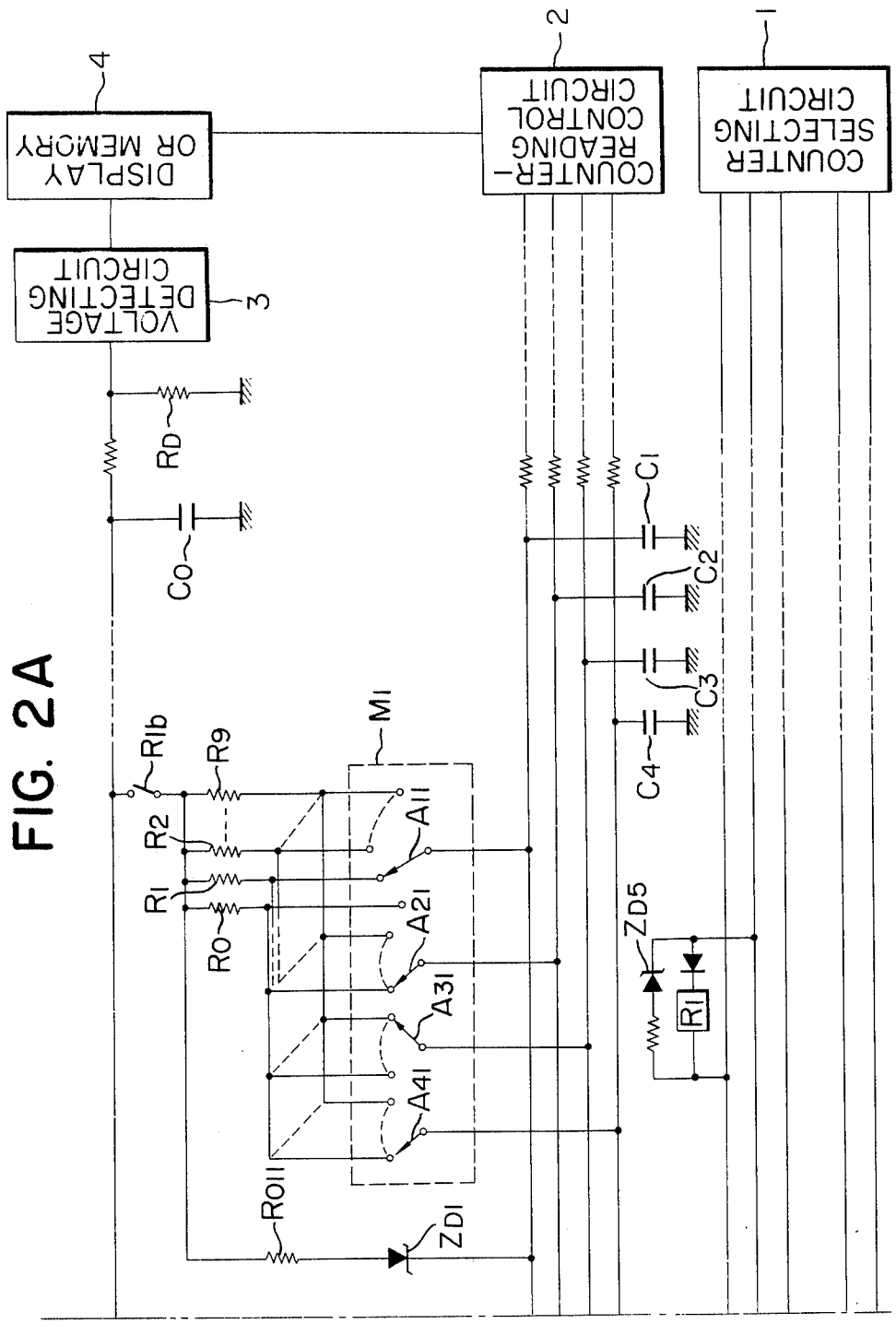

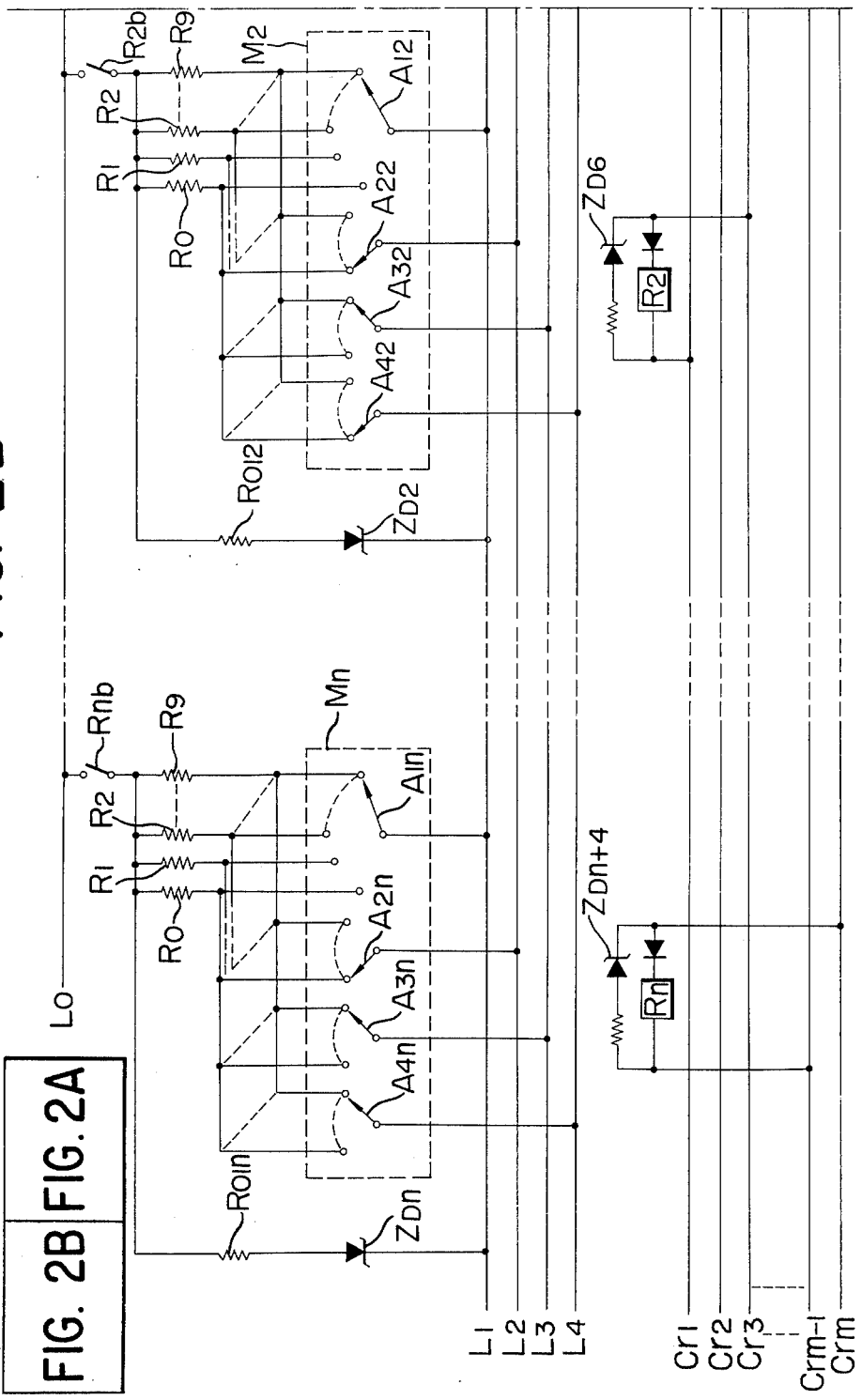

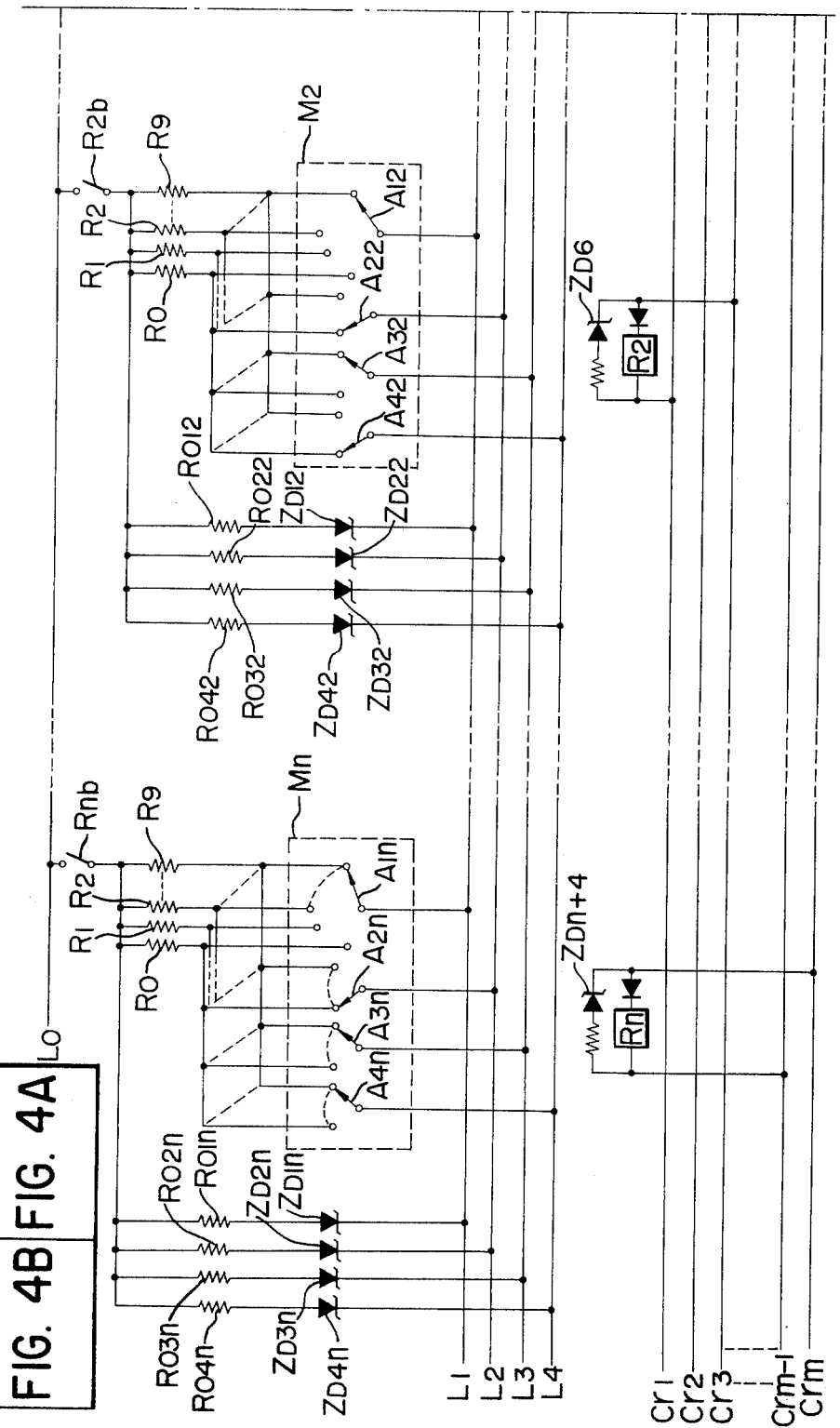

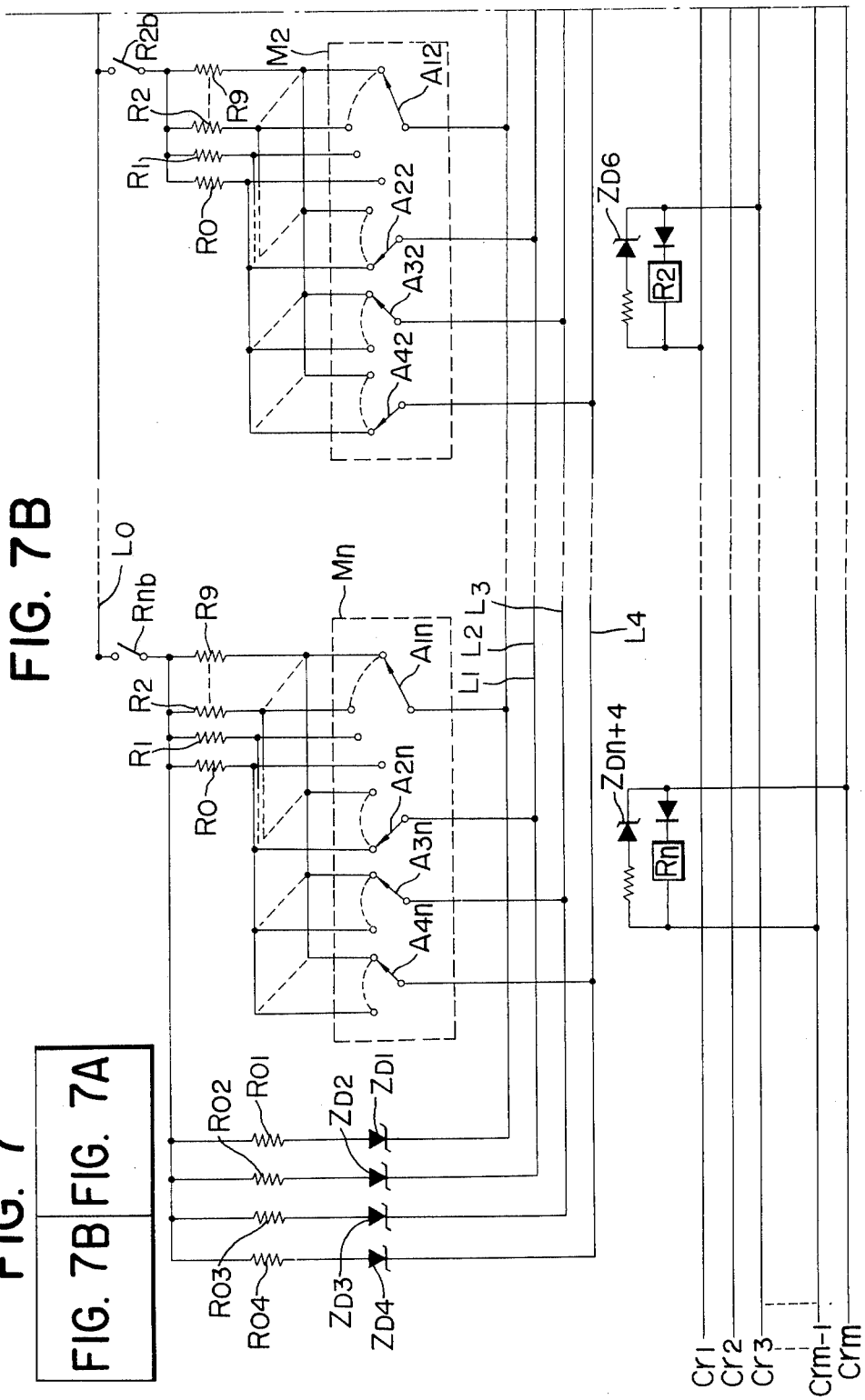

SYSTEM FOR COLLECTING DATA FROM METERS PLACED AT REMOTE PLACES

BACKGROUND OF THE INVENTION

The present invention relates to a data collection system for automatically reading electric, water or gas meters in remote places to collect data as to electric, water or gas quantities consumed for a predetermined period.

A prior art system which is related to the present invention will be described with reference to FIG. 1. A central or data collection station has a circuit 1 for controlling relays for selecting counters. For instance, a control signal is transmitted through counter-selection lines $C_{R1}$ and $C_{R2}$ to energize a coil of a relay $R_1$ to close a contact $R_{1b}$. Thereafter, a counter-reading control circuit 2 is operated to impress a predetermined voltage on a transmission line $L_1$ so that a current flows through the line $L_1$, a least-significant-digit contact $A_{11}$ of a counter $M_1$, a counter resister $R_1$, the relay contact $R_{1b}$, a common transmission line $L_0$ and a detecting resistor $R_D$. Counter resistors $R_0$ through $R_9$ of the counter $M_1$ have different values so that a value of the current flowing through the above circuit changes depending upon the position of the counter contact $A_{11}$ and is detected in terms of a voltage drop across the detecting resistor $R_D$ by a voltage detecting circuit 3. In this case, the least-significant-digit of the counter $M_1$ is 1. In like manner, the control circuit 2 impresses a predetermined voltage on a transmission line $L_2$ to read the next least-significant digit or second digit. Since a second-digit contact $A_{21}$ is connected to a resistor $R_0$, the second digit is 0. In like manner, the third digit and the fourth digit or most significant digit may be read out and displayed by a display device 4. In this case, reading of the counter $M_1$ results 0901.

In the prior art system of the type described, each of a plurality of transmission lines has stray capacitance so that when the control circuit 2 impresses a predetermined voltage on, for instance, the transmission line $L_1$, the latter is charged to stray capacitance $C_1$ within a relatively very short time as the transmission line $L_1$ has a relatively small resistance. After this stray capacitance $C_1$ has been charged, the common transmission line $L_0$ is charged through the counter resistor $R_1$ to a stray capacitance $C_0$. In general, the counter resistors $R_0$ through $R_9$ have high values ranging from 1K ohms to 10K ohms. Because the common transmission line $L_0$ is charged through one of these high resistance it takes a considerably long time before a voltage drop corresponding to that across the counter resistor $R_1$ is derived across the detecting resistor $R_D$. As a result, the control circuit 2 must be operated with a relatively long switching time sufficient to permit the charging of the common transmission line $L_0$ to $C_0$ so that high-speed data collection cannot be accomplished.

SUMMARY OF THE INVENTION

In view of the above, one of the objects of the present invention is to provide a data collection system which may eliminate the above problem so that the data collection speed may be substantially increased.

Another object of the present invention is to provide a data collection system which includes a very simple circuit which may permit the charging of the common transmission line to its stray capacitance within a very short time so that the reading time may be considerably reduced and erroneous reading may be eliminated.

BRIEF DESCRIPTION OF THE DRAWINGS:

FIG. 2; 2a; b is a circuit diagram of a first embodiment of the present invention;

Same reference numerals are used to designate similar parts throughout the figures.

DESCRIPTION OF THE PREFERRED EMBODIMENTS

Figure 3:
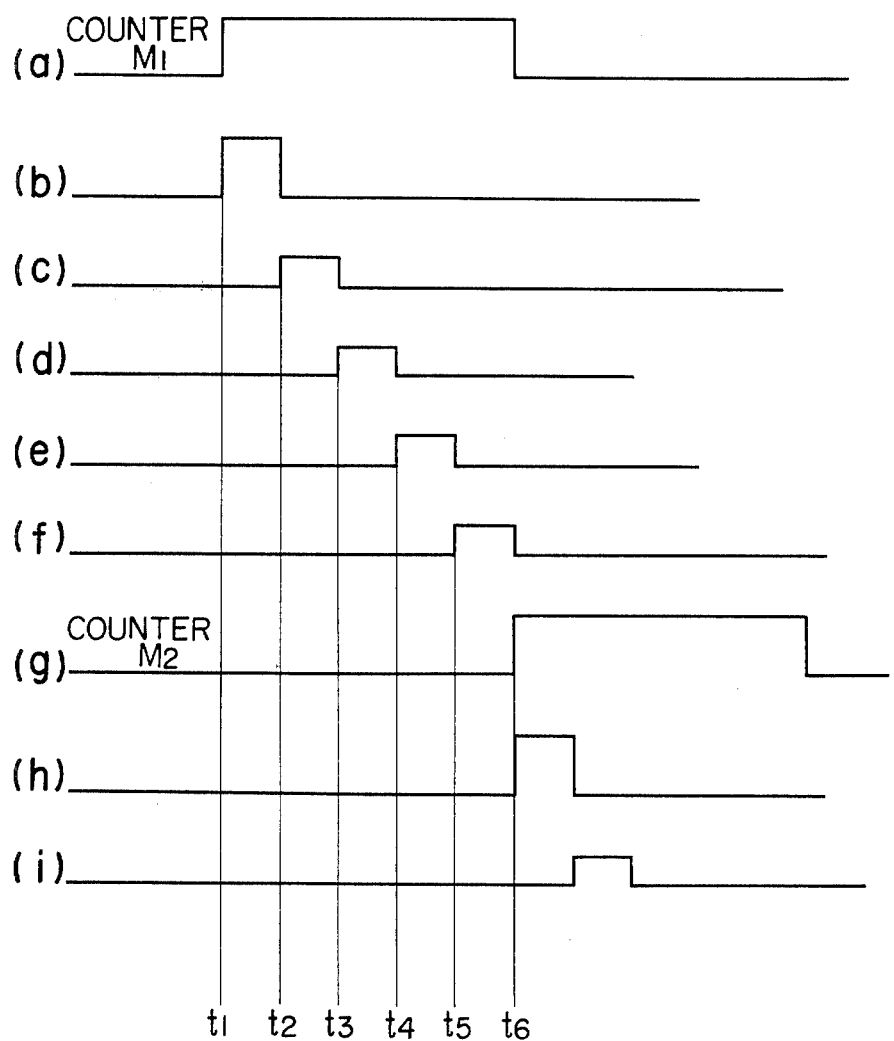
FIG. 3 shows electric waveforms used for the explanation of the mode of operation of the first embodiment.

First Embodiment, Figs. 2 and 3

As shown in FIG. 2, in each terminal station a series circuit consisting of a voltage control element such as a zener diode $Z_{D1}$ and a resistor $R_{011}$ is interconnected between the data transmission line $L_1$ and the counter contact $R_{1b}$. The resistor $R_{011}$ has a value sufficiently smaller than those of the counter resistors $R_0$ through $R_9$, but it may be eliminated when the transmission line $L_1$ has a sufficiently high resistance.

Figure 1A:
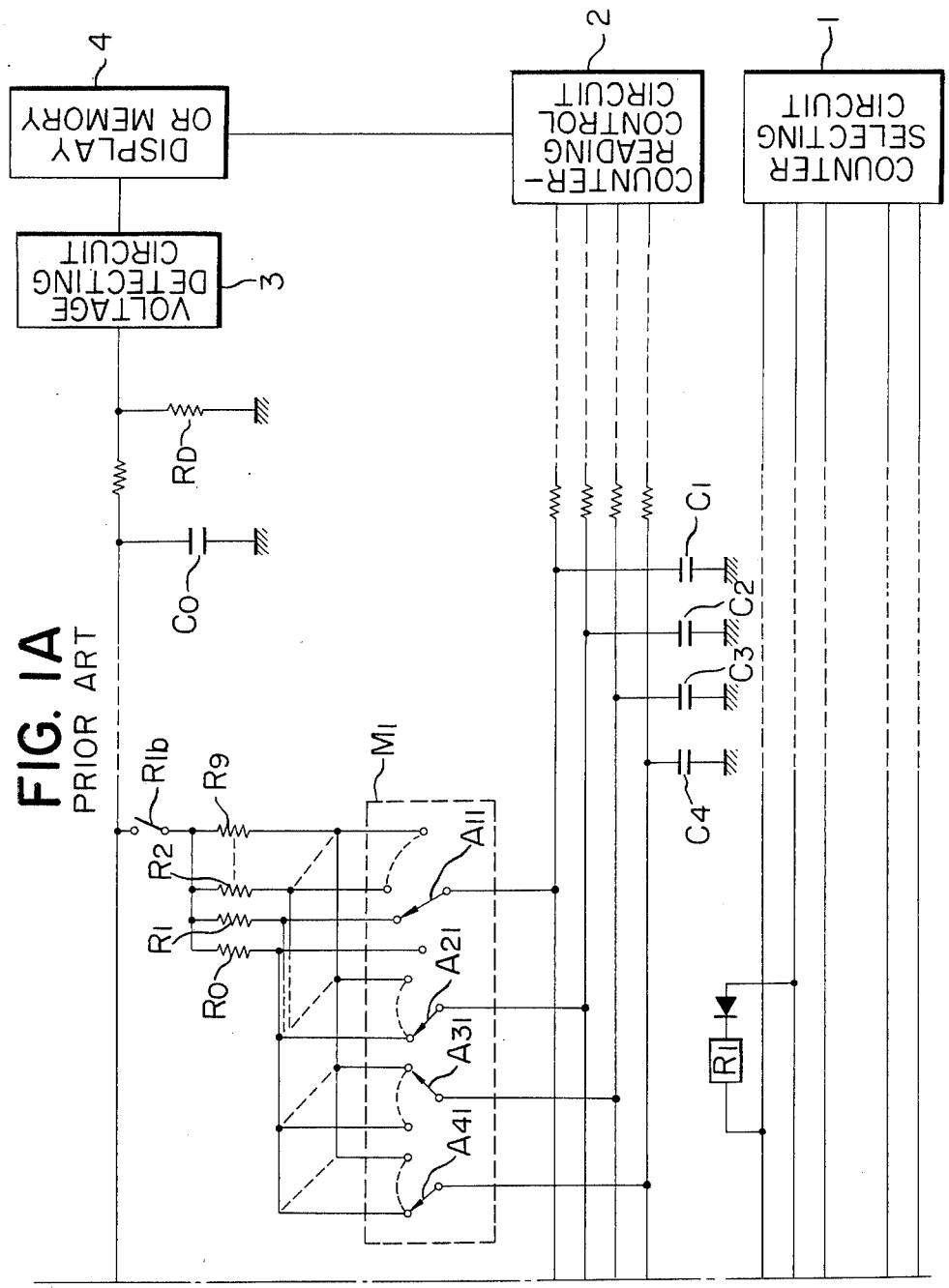
FIG. 1; 1a; b is a circuit diagram of a prior art data collection system.

Next with further reference to FIG. 3, the mode of operation of the first embodiment will be described. At time $t_1$ the relay control circuit 1 energizes the relay coil $R_1$ to close the relay contact $R_{1b}$ (See FIG. 3-a) as with the prior art system shown in FIG. 1. Next as shown at FIG. 3-b, the control circuit 2 selects the transmission line $L_1$ and impresses on it a voltage high enough to enable zener diode $Z_{D1}$ to conduct. Because this voltage is high and the zener diode $Z_{D1}$ exhibits a relatively small resistance, the common data transmission line $L_0$ may be immediately charged to the stray capacitance $C_0$. Because the data transmission line $L_1$ has a relatively very small resistance, the charging time thereof to the stray capacitance $C_1$ presents no problem at all. Next at $t_2$ the control circuit 2 impresses on the data transmission line $L_1$ a detecting voltage which is constant and lower than a zener or breakdown voltage of the zener diode $Z_{D1}$ (See FIG. 3-c). Then, because the data transmission lines $L_0$ and $L_1$ have been already charged, a voltage drop corresponding to the voltage drop across the counter resistor $R_1$ immediately appears across the detecting resistor $R_D$, is detected by the voltage detecting circuit 3 and is displayed by or stored in the display or memory device 4. In like manner, the control circuit 2 sequentially selects and impresses a predetermined voltage on the data transmission lines $L_2$, $L_3$ and $L_4$, so that the second digit, the third digit and the most significant digit may be sequentially read out at a relatively very small interval (See FIGS. 3-d, -e and -f) because the common data transmission line $L_0$ has been already charged to its stray capacitance $C_0$ through the zener diode $Z_{D1}$. Depending upon the position of the counter contact the stray capacitance must be recharged by the defecting voltage, but a time required for recharging the stray capacitance of the common data transmission line $L_0$ is negligible because the stray capacitance has been already charged.

After all of the digits of the representation of the counter $M_1$, the relay control circuit 1 de-energizes the coil $R_1$ and then energizes a coil $R_2$ of a relay in the next terminal station at $t_6$, and the data reading control circuit 2 impresses a relatively high voltage on the data transmission line $L_1$ (See FIG. 3-h) to charge the common data transmission line $L_0$ to its stray capacitance $C_0$. Thereafter, the representation of the counter $M_2$ is read out by digit in the same manner as described above.

Figure 4A:
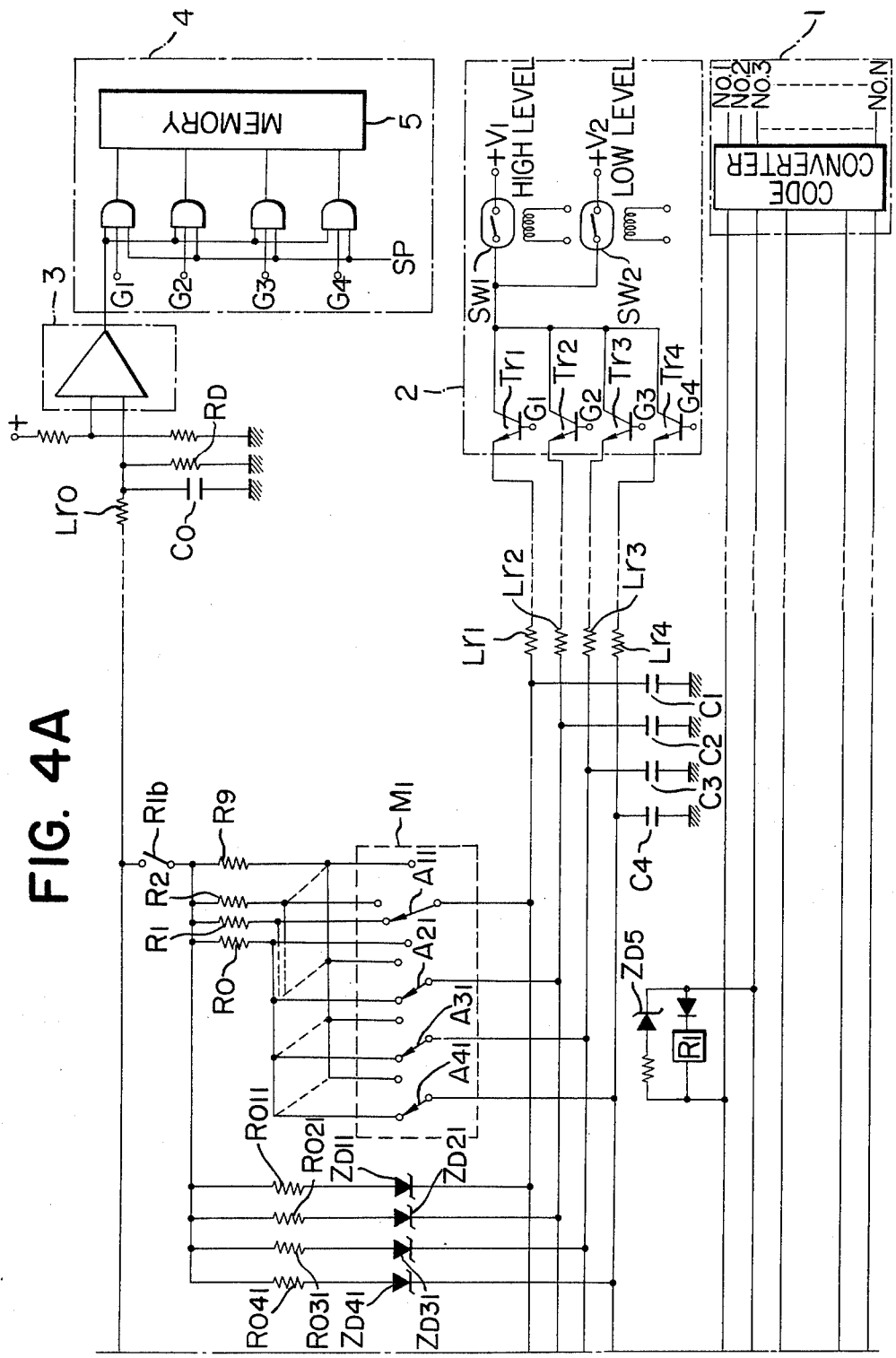
FIG. 4; 4a; b is a circuit diagram of a second embodiment of the present invention.
Figure 5:
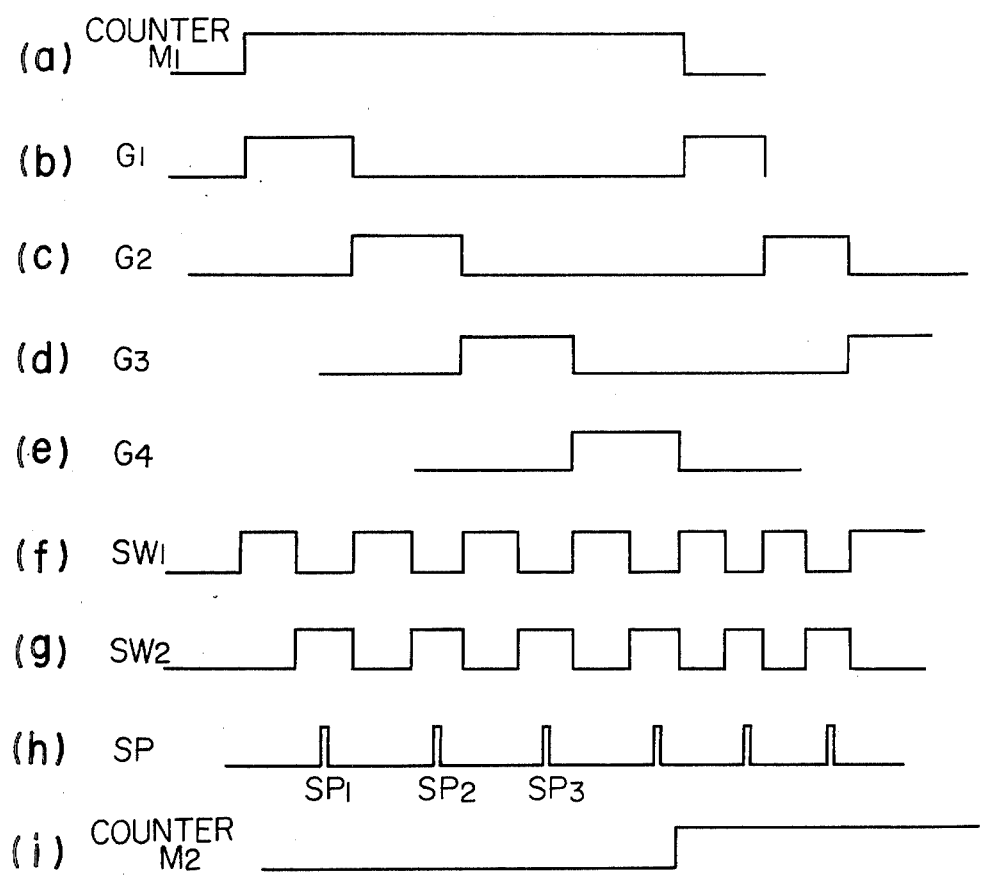
FIGS. 5 and 6 show electric wave forms used for the explanation of the mode of operation of the second embodiment.
Figure 6:
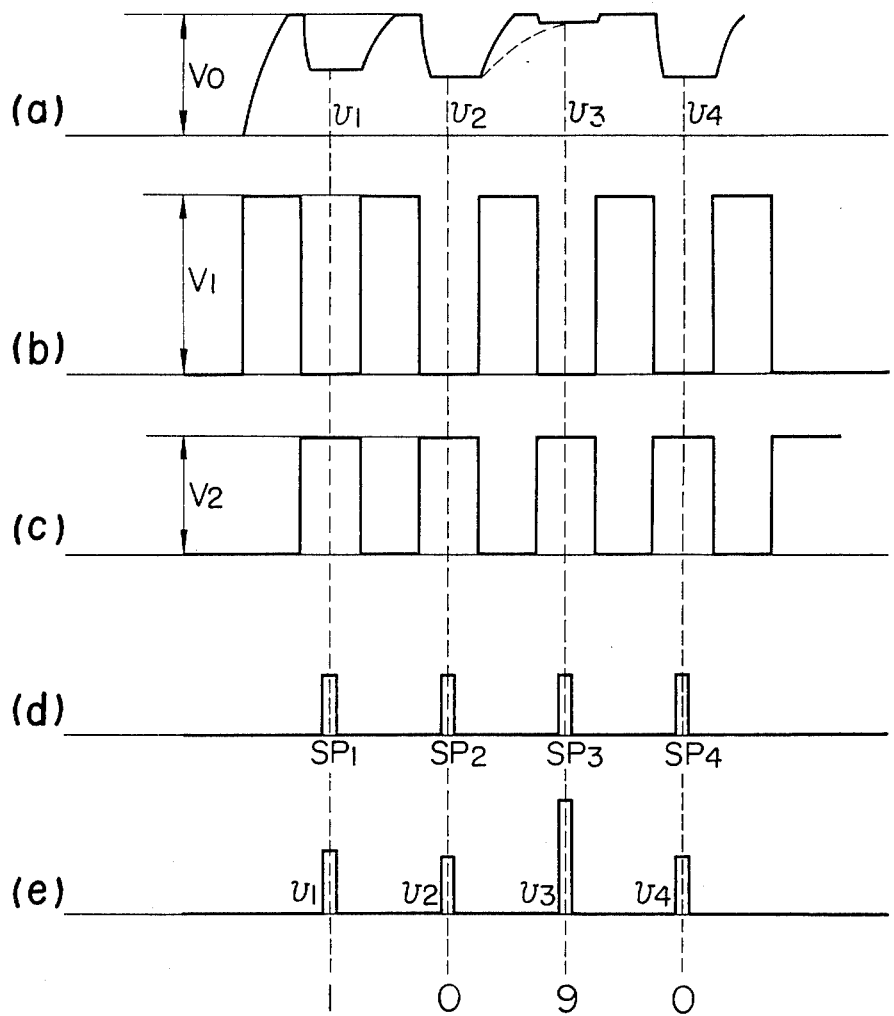

Second Embodiment, FIGS. 4, 5 and 6

In the second embodiment shown in FIG. 4, in each terminal station in addition to the data transmission line $L_1$, other data transmission lines $L_2$, $L_3$ and $L_4$ are connected through zener diodes $Z_{D2}$, $Z_{D3}$ and $Z_{D4}$, respectively, and resistors $R_{021}$, $R_{031}$ and $R_{041}$, respectively, to the counter contact $R_{1b}$, so that a relatively high-level voltage is impressed on each data transmission line prior to the reading of each digit and consequently a reading speed may be considerably increased.

In operation, the relay control circuit 1 energizes the relay coil $R_1$ of the first terminal station (See FIG. 5-a), and then the data-reading control circuit 2 impresses a gate voltage $G_1$ to a gate of a transistor $Tr_1$ of the data transmission line $L_1$ to enable it to conduct (See FIG. 5-b). Simultaneously, a switch $SW_1$ is closed to impress a high-level voltage to a circuit consisting of the data transmission line $L_1$, the zener diode $Z_{D11}$, the resistor $R_{011}$, the counter contact $R_{1b}$ and the common data transmission line $L_0$ so that the data transmission line $L_1$ and the common data transmission line $L_0$ are charged to their respective stray capacitance $C_1$ and $C_0$. Next a switch $SW_2$ is closed simultaneous with the opening of the switch $SW_1$ so that a predetermined low-level voltage is impressed on the transmission line $L_1$. A voltage across the detecting resistor $R_D$, which is representative of the voltage across the counter resistor $R_1$ is derived by a sampling puls $SP_1$ and stored in a memory 5. Thereafter, the data-reading control circuit 2 closes the gate of the transistor $Tr_1$ while impressing a gate voltage $G_2$ to a gate of a transistor $Tr_2$ to enable it to conduct (See FIG. 5-c). Next the switch $SW_1$ is closed to impress a high-level voltage on a circuit consisting of the data transmission line $L_2$, the zener diode $Z_{D21}$, the resistor $R_{021}$, the counter contact $R_{1b}$ and the common data transmission line $L_0$ so that the data transmission line $L_2$ and the common data transmission line $L_0$ are charged to their respective stray capacitance $C_2$ and $C_0$. Thereafter, the switch $SW_1$ is opened while the switch $SW_2$ is closed to impress a low-level voltage on the data transmission line $L_2$ so that a voltage across the defecting resistor $R_D$, which is representative of a voltage across the counter resistor $R_0$ is derived by the sampling puls $SP_2$ and stored in the memory 5. In like manner, the third digit and the fourth or most significant digit are read out and stored, and the relay control circuit 1 de-energizes the relay coil $R_1$ while energizing the relay coil $R_2$ of the next terminal station. In this way, respective terminal stations are sampled sequentially.

Next the reason why high-speed reading is possible in the second embodiment shown in FIG. 4 will be described in detail. Because of the low resistance $L_{r1}$, $L_{r2}$, $L_{r3}$ and $L_{r4}$ of the data transmission lines itself, even with a low-level voltage the stray capacitance $C_1$, $C_2$, $C_3$ and $C_4$ of the data transmission lines may be charged within a relatively short time to their respective stray capacitance but it is clear that when a high-level voltage is impressed as described previously, they may be charged more rapidly. However, this is not the main object of the second embodiment. The main object is to recharge, prior to each reading or sampling of digits, the common data transmission line $L_0$ having a relatively long time constant which is determined by the stray capacitance $C_0$ and the value of one of the counter resistors $R_0$ through $R_9$ each having a high value.

The mode of operation of the second embodiment will be described in more detail with further reference to FIG. 6. As described previously, when the switch $SW_1$ is closed, a highlevel voltage $V_1$ (See FIG. 6-b) is supplied to the stray capacitance $C_0$ of the common data transmission line $L_0$ through the transistor $Tr_1$, the data transmission line $L_1$, the zener diode $Z_{D11}$ and the relay contact $R_{1b}$ so that the stray capacitance $C_0$ is charged to $V_0$ (See FIG. 6-a). Therefore, at this instant the voltage across the detecting resistor $R_D$ is equal to $V_0$. When the switch $SW_1$ is opened, the charge stored in the stray capacitance $C_0$ is rapidly discharged through $R_D$ simultaneously with the opening of the switch $SW_1$ so that a low-level voltage $V_2$ (See FIG. 6-c) is supplied through the counter resistor $R_1$ so that the discharge of the stray capacitance $C_0$ is prevented and a current having a magnitude dependent upon the value of the counter resistor $R_1$ flows through the detecting resistor $R_D$ so that a voltage $v_1$ corresponding to the value of the counter resistor $R_1$ appears across the detecting resistor $R_D$. This voltage $v_1$ is sampled (See FIG. 6-e) by the sampling pulse $SP_1$ (See FIG. 6-d) and stored in the memory 5. Thus, the first or least significant digit "1" of the data represented by the counter $M_1$ is stored.

Next the gate of the transistor $Tr_1$ is closed while the gate of the transistor $Tr_2$ is opened and the switch $SW_1$ is closed to supply the high-level voltage $V_1$ to a circuit consisting of the data transmission line $L_2$, the zener diode $Z_{D21}$ and the common data transmission line $L_0$ so that the stray capacitance is immediately recharged to $V_0$ from $v_1$. Thereafter, the switch $SW_1$ is opened while the switch $SW_2$ is closed so that the low-level voltage $V_2$ is impressed through the counter resistor $R_0$ to the detecting resistor $R_D$ and consequently a voltage $v_2$ corresponding to the resistance of the counter resistor $R_0$; that is, the second digit is derived across the detecting resistor $R_D$. The second digit, which is "0" in this embodiment, is sampled by a sampling pulse $SP_2$ and stored. In like manner, voltages $v_3$ and $v_4$ representing the third and fourth digits, respectively, or the values of the counter resistors $R_9$ and $R_0$ may be derived and stored.

When the high-level voltage $V_1$ were not used, as with the case of the first embodiment shown in FIG. 2, for recharging the common data transmission line $L_0$ to the stray capacitance $C_0$ prior to each reading from the second digit, it would take a considerably long time to charge from $v_2$, which is a relatively low voltage, to the high voltage $v_3$ when a digit represented by the counter resistor $R_9$ having a relatively high resistance is to be read out after a digit represented by the counter resistor $R_0$ having a relatively low resistance. As a result, the reading speed is decreased. In each digit reading, there is a chance that after a digit has been read out through the counter resistor $R_0$ having the lowest resistance, a digit must be read out through the counter resistor $R_9$ having the highest resistance. Therefore, the whole read time is further delayed. In this respect, the second embodiment shown in FIG. 4 has a distinct advantage over the first embodiment shown in FIG. 2 in that reading speed is far faster.

Figure 7A:
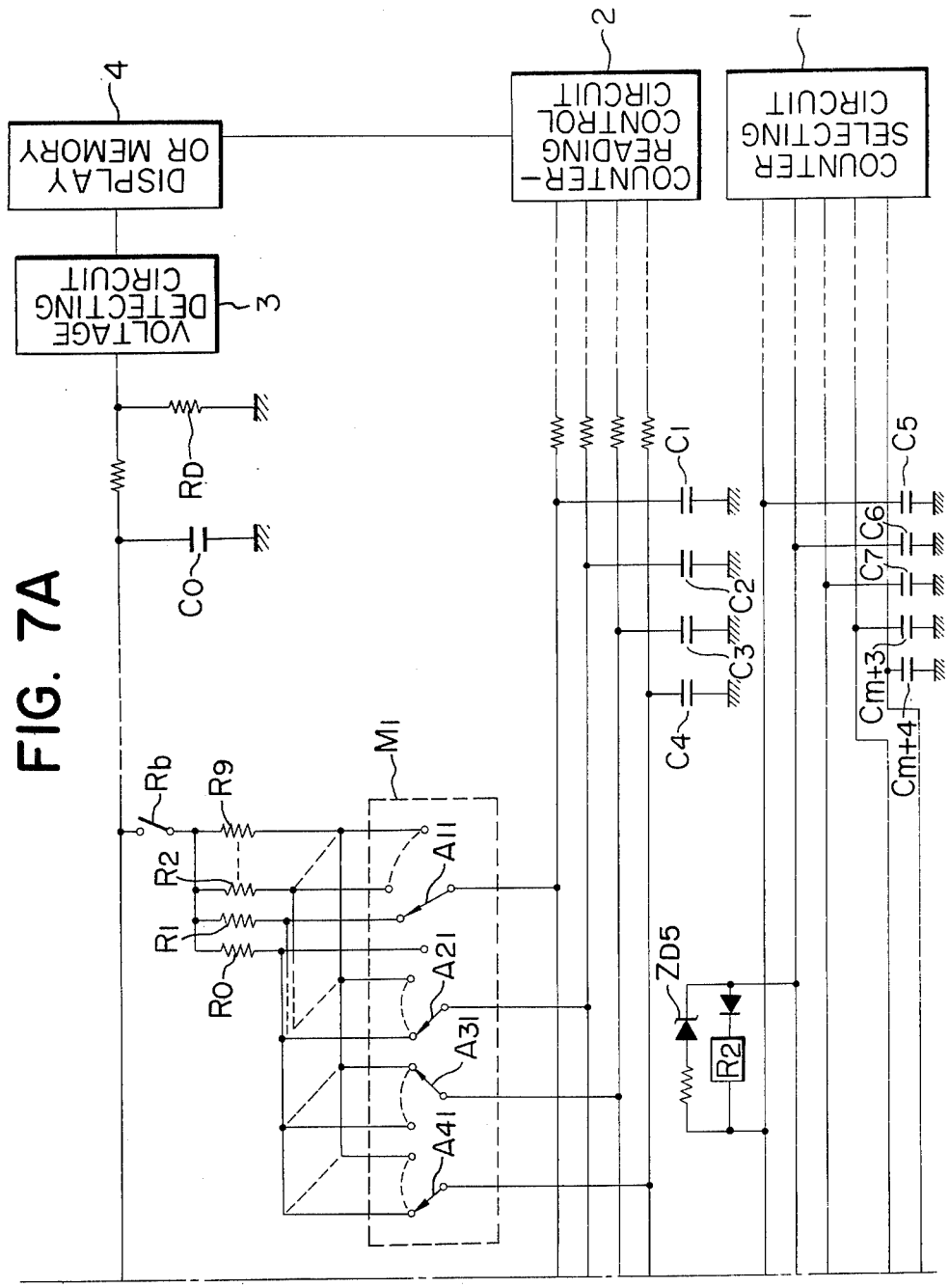
FIG. 7; 7a; b is a circuit diagram of a third embodiment of the present invention.

Third Embodiment, FIG. 7

The third embodiment shown in FIG. 7 is substantially similar in construction to the second embodiment shown in FIG. 4 except that the transmission lines $L_1$, $L_2$, $L_3$ and $L_4$ are connected through the zener diodes and resistors to the common data transmission line $L_0$ at the ends of the data transmission lines instead of being connected through each terminal station. Therefore, the capital cost may be considerably reduced because of the elimination of the zener diodes in each terminal station. Furthermore, the mode of operation is substantially similar to that of the second embodiment so that high-speed reading may be assured.

So far delay in reading due to the stray capacitance of the common data transmission line $L_0$ has been described, but the counter-selection signal transmission lines $C_{r1}$ through $C_{rm}$ have also stray capacitance $C_5$ through $C_{m+4}$ so that delay in reading occurs because of delay in response of counter selection relays $R_1$ through $R_n$. To overcome this problem, a zener diode is connected in parallel with each relay coil as shown in FIGS. 2, 4 and 7, and is impressed with a relatively high-level voltage by the relay control circuit 1 so that the counter selection signal transmission line may be immediately charged to its stray capacitance prior to the energization of the relay coil. Thus the response of the relays $R_1$ through $R_n$ may be considerably improved.

What is claimed is:

1. In a data collection system of the type comprising a plurality of counter-meters installed at remote places, a data collection station for reading data from said countermeters, a plurality of transmission lines interconnected between said counter-meters and said data collection station and comprising one common data transmission line and a plurality of other data transmission lines equal in number to the number of digits of each counter-meter, each counter-meter having a plurality of resistors equal in number to the number of digits of the counter-meter, each resistor being coupled between the corresponding counter-meter and one of said transmission lines to indicate a value at a corresponding digit position, said data collection station including means for sequentially sampling said counter-meters to read and collect the data of each counter-meter through said transmission lines, the improvement comprising:
a voltage threshold element interconnected between said common data transmission line and each of said other data transmission lines corresponding to each digit to be read out, said voltage threshold element being connected in parallel with said resistors of each counter-meter, said threshold element exhibiting a dynamic impedance substantially less than that of each of said resistors when subjected to a predetermined high-level voltage, and a resistance substantially greater than that of each of said resistors when subjected to a predetermined low-level voltage, means for applying said high-level voltage between said common data tranmission line and a selected one of said other data transmission lines to cause a relatively high current to flow through said voltage threshold element to charge stray capacitance between said common data transmission line and said selected other data transmission line and between each of said lines and ground, and means for thereafter applying said predetermined low-level voltage between said selected data transmission line and said common data transmission line to cause current to flow through a corresponding one of said resistors of said counter-meter so that the corresponding digit value may be determined at said station.

2. A data collection system as set forth in claim 1 wherein other voltage threshold elements are interconnected between the common data transmission line and each of the remaining data transmission lines so that prior to each digit reading the stray capacitance between said common data transmission line and each other data transmission line and between each of said lines and ground may be charged.

3. A data collection system as set forth in claim 1 wherein said voltage threshold element is a zener diode.

4. A data collection system according to claim 2, wherein said voltage threshold elements are interconnected between said common data transmission line and the data transmission lines at the ends of said data transmission lines remote from said station.

5. A data collection system according to claim 1, wherein installed adjacent to each of said counter-meters is a relay having a coil connected through relay-control signal transmission lines to said data collection station, said station including means for selecting and energizing the coil of the relay of a desired counter-meter to select said desired counter-meter for data reading, a voltage threshold element being connected in parallel with the coil of each relay, means for applying said predetermined high-level voltage across said voltage threshold element to charge the stray capacitance of the relay control signal transmission lines, and means for thereafter applying said low-level predetermined voltage to energize the coil of the relay.

* * * * *